US012641002B2

(12) United States Patent
    Yan

(10) Patent No.: US 12,641,002 B2
(45) Date of Patent: May 26, 2026

(54) METHOD AND APPARATUS OF DETECTING MESSAGE DELAY, ELECTRONIC DEVICE, AND STORAGE MEDIUM

(71) Applicant: SHENZHEN TCL NEW TECHNOLOGY CO., LTD., Shenzhen (CN)

(72) Inventor: Siwei Yan, Shenzhen (CN)

(73) Assignee: SHENZHEN TCL NEW TECHNOLOGY CO., LTD., Shenzhen (CN)

( * ) Notice: Subject to any disclaimer, the term of this patent is extended or adjusted under 35 U.S.C. 154(b) by 161 days.

(21) Appl. No.: 18/576,384

(22) PCT Filed: May 6, 2022

(86) PCT No.: PCT/CN2022/091169
    § 371 (c)(1),
    (2) Date: Jan. 4, 2024

(87) PCT Pub. No.: WO2023/279829
    PCT Pub. Date: Jan. 12, 2023

(65) Prior Publication Data
    US 2024/0314051 A1      Sep. 19, 2024

(30) Foreign Application Priority Data
    Jul. 6, 2021    (CN) .......................... 202110762437.9

(51) Int. Cl.
    *H04L 43/0852*        (2022.01)
    *G06F 11/34*          (2006.01)
                (Continued)
(52) U.S. Cl.
    CPC ................................ *H04L 43/0852* (2013.01)

(58) Field of Classification Search
    CPC ..... H04L 43/0852; H04L 43/16; H04L 43/50; G06F 11/3466; G06F 11/3419
    See application file for complete search history.

(56) References Cited

U.S. PATENT DOCUMENTS 6,442,139 B1    8/2002  Hosein
2009/0257441 A1 *  10/2009  Hata ................... H04L 49/9047
                                    370/412
(Continued)

FOREIGN PATENT DOCUMENTS

CN        104978232 A      10/2015
CN        106959899 A   *   7/2017  ............. G06F 9/546
                (Continued)

OTHER PUBLICATIONS

International Search Report in International application No. PCT/CN2022/091169, mailed on Aug. 10, 2022.
(Continued)

*Primary Examiner* — Kamal M Hossain
(74) *Attorney, Agent, or Firm* — PV IP PC; Wei Te Chung

(57) ABSTRACT

An embodiment of the present application discloses a method and an apparatus of detecting message delay, an electronic device, and a storage medium. The method includes: obtaining a processing time period corresponding to a message in the target thread when a target thread of an application program is executed in a terminal system; performing type recognition on the message in the target thread to obtain a message type of the message; determining a message delay threshold corresponding to the message based on the message type; performing delay detection on the message based on the processing time period and the message delay threshold to obtain a delay detection result of the message.

15 Claims, 6 Drawing Sheets

(51) Int. Cl.
  *H04L 43/16*      (2022.01)
  *H04L 43/50*      (2022.01)

(56)                References Cited

U.S. PATENT DOCUMENTS

| | | | |
|---|---|---|---|
| 2011/0219377 A1* | 9/2011 | Gowda ................... | G06F 9/505 |
| | | | 718/102 |
| 2012/0151589 A1 | 6/2012 | Hershey et al. | |
| 2013/0081001 A1 | 3/2013 | Mccoll et al. | |
| 2019/0163545 A1 | 5/2019 | Singh et al. | |
| 2019/0349309 A1 | 11/2019 | Bonig et al. | |
| 2022/0413909 A1* | 12/2022 | Kakaiya ................ | G06F 9/4887 |

FOREIGN PATENT DOCUMENTS

| | | | | |
|---|---|---|---|---|
| CN | 108153596 A | 6/2018 | | |
| CN | 108388479 A | 8/2018 | | |
| CN | 109379247 A | 2/2019 | | |
| CN | 109560976 A | 4/2019 | | |
| CN | 109753321 A | 5/2019 | | |
| CN | 110099013 A | 8/2019 | | |
| CN | 110995618 A | 4/2020 | | |
| CN | 111949497 A | 11/2020 | | |
| CN | 112787958 A | 5/2021 | | |
| CN | 112925661 A | 6/2021 | | |
| CN | 113064707 A | 7/2021 | | |
| CN | 113535442 A | * 10/2021 | .......... | G06F 11/0781 |
| CN | 113595814 A | 11/2021 | | |
| WO | 2018048999 A1 | 3/2018 | | |
| WO | 2019125642 A1 | 6/2019 | | |

OTHER PUBLICATIONS

Written Opinion of the International Search Authority in International application No. PCT/CN2022/091169, mailed on Aug. 10, 2022.

Chinese Office Action issued in corresponding Chinese Patent Application No. 202110762437.9 dated Dec. 7, 2023, pp. 1-8.

* cited by examiner

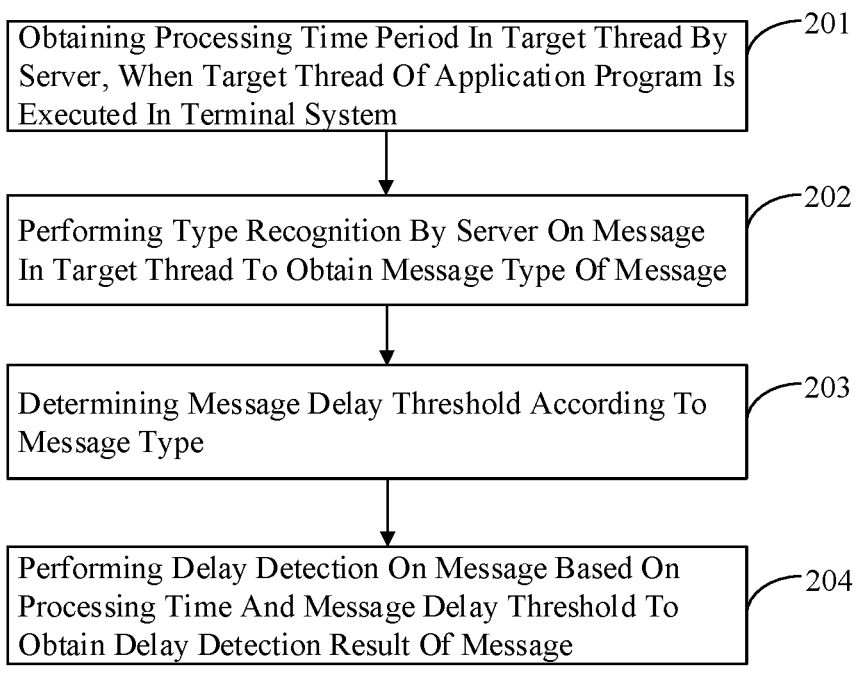

Obtaining Processing Time Period In Target Thread By Server, When Target Thread Of Application Program Is Executed In Terminal System ⌐201

Performing Type Recognition By Server On Message In Target Thread To Obtain Message Type Of Message ⌐202

Determining Message Delay Threshold According To Message Type ⌐203

Performing Delay Detection On Message Based On Processing Time And Message Delay Threshold To Obtain Delay Detection Result Of Message ⌐204

FIG.7

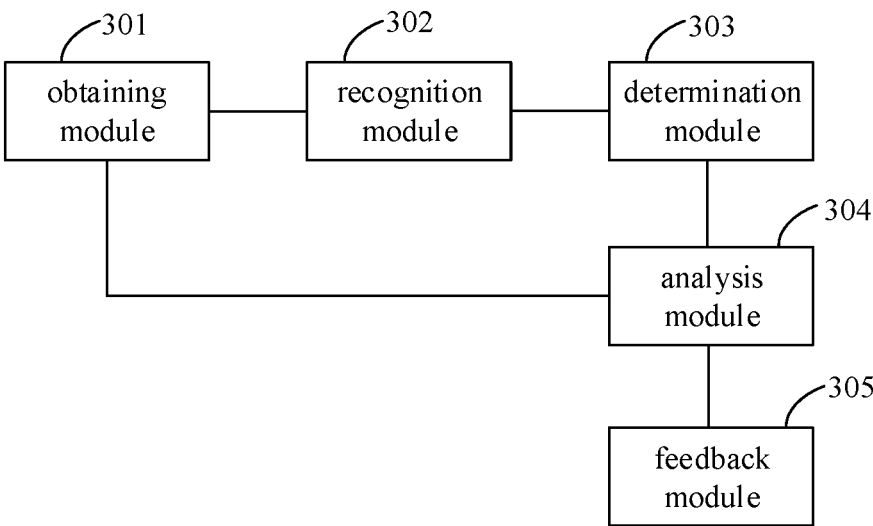

⌐301 obtaining module

⌐302 recognition module

⌐303 determination module

⌐304 analysis module

⌐305 feedback module

FIG.8

METHOD AND APPARATUS OF DETECTING MESSAGE DELAY, ELECTRONIC DEVICE, AND STORAGE MEDIUM

CROSS REFERENCE TO RELATED APPLICATIONS

This application is a US national phase application based upon an International Application No. PCT/CN2022/091169, filed on May 6, 2022, and this application claims priority to Chinese Patent Application No. 202110762437.9, filed with the Chinese Patent Office on Jul. 6, 2021 and entitled "METHOD AND APPARATUS OF DETECTING MESSAGE DELAY, ELECTRONIC DEVICE, AND STORAGE MEDIUM". The entire disclosures of the above application are incorporated herein by reference.

TECHNICAL FIELD

The present application relates to a field of computer technology, and more particularly, to a method and an apparatus of detecting message delay, an electronic device, and a storage medium. The storage medium includes a non-transitory computer readable storage medium.

BACKGROUND

With the rapid development of computer technology, an electronic device is widely applied, and people often perform daily learning and work by using various application programs in the electronic device.

The use of the application program needs to depend on a terminal system in the electronic device. The terminal system provides a running environment for the application program. The terminal system usually performs communication by sending a message. The message is an object transmitted by a communication system and is a carrier of information. However, a delay often occurs in a sending process of the message, that is, a delay occurs when the message is processed in a thread. Once the delay time is too long, the performance of the system is affected. For example, a picture of a user interface (UI) layer is stuck, or even a crash occurs, which finally affects a user experience. Therefore, how to detect the delay and quickly obtain a cause of the delay is of great significance to ensure smoothness of the system.

SUMMARY

Technical Problem

In some systems, a delay detection mechanism, such as a native delay detection mechanism in an Android system, is provided, so that a delay report is returned when a certain time lapses, but the result of such delay detection is inaccurate.

Technical Solutions

The present application provides a method and an apparatus of detecting message delay, an electronic device, and a storage medium, and aims to improve the accuracy of message delay detection.

In view of above, the technical solution adopted by the present application to solve the technical problem is as follows:

In a first aspect, the present application provides a method of detecting message delay, including:

obtaining a processing time period corresponding to a message in a target thread, when the target thread of an application program is executed in a terminal system;

performing type recognition on the message in the target thread to obtain a message type of the message;

determining a message delay threshold corresponding to the message based on the message type; and performing delay detection on the message based on the processing time period and the message delay threshold to obtain a delay detection result of the message.

In a second aspect, the present application further provides an apparatus of detecting message delay including:

an obtaining module, configured to obtain a processing time period corresponding to a message in a target thread, when the target thread of an application program is executed in a terminal system;

a recognition module, configured to perform type recognition on the message in the target thread to obtain a message type of the message;

a determination module, configured to determine a message delay threshold corresponding to the message based on the message type obtained by the recognition module; and an analysis module, configured to perform delay detection on the message based on the processing time period obtained by the obtaining module and the message delay threshold obtained by the determination module to obtain a delay detection result of the message.

Alternatively, in some embodiments of the present disclosure, the determination module includes:

a first obtaining unit, configured to obtain a mapping relationship set including a mapping relationship between a preset message type and a preset message delay threshold; and a first determination unit, configured to determine the message delay threshold corresponding to the message based on the mapping relationship set obtained by the first obtaining unit and the message type recognized by the recognition module.

Alternatively, in some embodiments of the present disclosure, the determination module includes:

a second determination unit, configured to determine a message delay threshold interval corresponding to the message type; and a third determination unit, configured to determine the message delay threshold corresponding to the message from the message delay threshold interval based on a delay frequency at which a delay occurs for the message type.

Alternatively, in some embodiments of the invention, the third determination unit includes:

a selection subunit, configured to select an initial message delay threshold from the message delay threshold interval;

a recording subunit, configured to record a delay frequency at which the delay occurs for the message type; and an adjustment subunit, configured to adjust the initial message delay threshold within the message delay threshold interval based on the delay frequency to obtain the message delay threshold corresponding to the message.

Alternatively, in some embodiments of the present disclosure, the processing time period includes a dispatch delay time period during which the message is dispatched from the message queue of the target thread, and the obtaining of the processing time period corresponding to the message in the target thread is configured to:

determine an expected dispatch time point at which the message is dispatched from the message queue, upon the message in the target thread enters the message queue;

obtain an actual dispatch time point at which the message is dispatched from the message queue upon the message is dispatched from the message queue; and generate the dispatch delay time period of the message based on the actual dispatch time point and the expected dispatch time point.

Alternatively, in some embodiments of the present disclosure, the processing time period includes a dispatch delay time period during which the message is dispatched from the message queue of the target thread, and the obtaining of the processing time period corresponding to the message in the target thread is configured to:

obtain an execution start time point of the message when the message in the target thread starts to be executed after being dispatched;

obtain an execution end time point of the message when message execution ends; and generate the execution time period of the message based on the execution start time point and the execution end time point.

Alternatively, in some embodiments of the present disclosure, the apparatus further includes a feedback module including:

a second obtaining unit, configured to obtain device information of a device running the application program and delay information of the message which is delayed, in response that the delay detection result of the message is that the message is delayed; and a first output unit, configured to output the device information and the delay information.

According to a third aspect, an embodiment of the present application further provides an electronic device including a memory, a processor, and a computer program stored in the memory and operable on the processor, wherein the processor, when executing the computer program, implements operations of the method of detecting message delay described above.

According to a fourth aspect, an embodiment of the present disclosure further provides a storage medium having stored thereon a computer program which, when executed by a processor, implements operations of the method of detecting message delay described above.

Beneficial Effect

In an embodiment of the present application, a processing time period of a message in a thread and a message delay threshold corresponding to the message are obtained, and a message delay detection result is obtained according to the message processing time period and the message delay threshold. The obtaining of the message delay threshold of the message is determined according to the message type of the message. For different message types, different message delay thresholds are set, so that the message delay detection result is more accurate. In addition, the present application may accurately obtain the delay condition of each message in the thread by detecting the delay of the message in the thread, so that the granularity of the message delay detection is finer, and the accuracy of message delay localization is improved.

DRAWING ILLUSTRATION

The technical solution of the present application and its beneficial effects will be apparent from the following detailed description of specific embodiments of the present application in conjunction with the accompanying drawings.

FIG. 7 is a flow diagram of a method of detecting message delay according to another embodiment of the present application;

FIG. 8 is a schematic block diagram of an apparatus of detecting message delay according to an embodiment of the present application;

The objectives, functional features and advantages of the present application will be further described with reference to the accompanying drawings.

EMBODIMENTS OF THE INVENTION

Technical solutions in embodiments of the present application will be clearly and completely described below in conjunction with drawings in the embodiments of the present application. Apparently, the described embodiments are only a part of embodiments of the present application, rather than all the embodiments. According to the embodiments of the present disclosure, all other embodiments obtained by those skilled in the art without creative work fall within the scope of the present disclosure.

Embodiments of the present application provide a method and an apparatus of detecting message delay, an electronic device, and a storage medium. An embodiment of the present application provides an apparatus of detecting message delay, which may be applied to an electronic device. The electronic device may be a server, a terminal, or the like. The terminal may be a notebook, a desktop, a smartphone, a smart TV, a tablet computer, an on-board intelligent terminal, or the like. The server may be a separate physical server, may also be a server cluster or a distributed system composed of a plurality of physical servers, or may further be a cloud server providing a basic cloud computing service such as a cloud service, a cloud database, a cloud computing, a cloud function, a cloud storage, a network service, a cloud communication, a middleware service, a domain name service, a security service, a content delivery network (CDN), and big data and an artificial intelligence platform. The server may be directly or indirectly connected by a wired or wireless communication manner.

It will be appreciated that a method of detecting message delay according to an embodiment of the present application may be executed by a terminal, may be executed by a server, or may be commonly executed by the terminal and the server.

Figure 1:
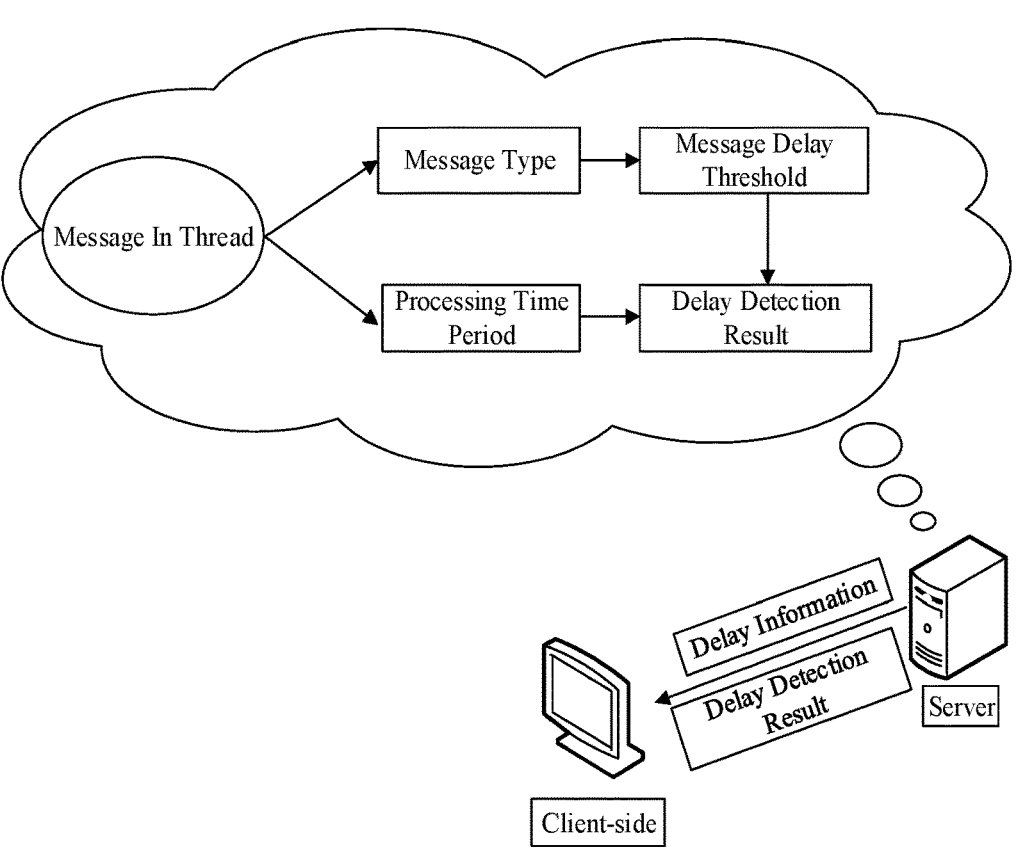
FIG. 1 is a schematic diagram of a scenario for a method of detecting message delay according to an embodiment of the present application.

For example, referring to FIG. 1, a method of detecting message delay commonly performed by the terminal and the server is described as an example in an embodiment of the present application. Other devices may be added to the terminal and the server to assist in performing the method of detecting message delay. The types of the other devices are not limited herein. The terminal and the server are connected via a network, for example, via a wired or wireless network. The apparatus of detecting message delay may be integrated into the server, and the integration of the apparatus of detecting message delay into the terminal may be understood with reference to the integration of the apparatus of detecting message delay into the server.

The integration of the apparatus of detecting message delay into the server includes: obtaining by the server a processing time period of message in a thread when an application program is executed, determining a message delay threshold of the message according to the message type of the message, and obtaining a result of delay detection on the message in the thread when the thread is executed according to the processing time period of the message and the message delay threshold of the message.

The terminal may trigger and enable the application program, and then the server performs delay detection on the message in the thread when the application program runs. The terminal may receive, from the server, a result of the delay detection on the message, so that the maintenance personnel may make corresponding adjustment at the terminal according to the result of the delay detection.

The method of detecting the message delay according to an embodiment of the present application relates to a problem of processing of the message in a thread when the application program is running in a terminal system. In an embodiment of the present application, after recognizing the message type of the message, a message delay threshold corresponding to the message is determined according to the message type, a processing time period of the message in a thread is obtained, and delay detection is performed on the message according to the message delay threshold and the processing time period of the message to obtain a delay detection result of the message.

In an embodiment of the present application, the delay detection result of the message may include delay in the message processing or normal in the message processing. Therefore, for different delay detection results, the maintenance personnel may make different adjustments at the client. For example, the delay detection result indicates that the message is delayed, and the maintenance personnel may timely find the position and the cause of the delay based on the delay detection result, and timely adjust the corresponding position to ensure the smoothness execution of thread. If the delay detection result indicates that the message processing is normal, the maintenance personnel may make no adjustment.

In addition, the message delay threshold of the message in the thread is determined according to the message type of the message, and the message delay thresholds corresponding to the messages of different message types may be different. The specific value of the message delay threshold may be set according to the experience of the manager or the maintenance personnel, the application, or the requirements of the scene. The specific setting manner and the setting standard for the message delay threshold are not limited herein.

In an embodiment of the application, different message delay thresholds are set for respective messages of different message types in the thread. Therefore, when the application program runs, a message delay threshold of the message in the thread may be determined according to the message type of the message. After a processing time period of the message is obtained. A delay detection result of the message is obtained according to the processing time period of the message and the message delay threshold. After the delay detection result is output. If the delay detection result indicates that the message is delayed, it is also convenient for a manager to determine a specific position and a specific cause of the delay according to the delay detection result, so as to facilitate rapid adjustment for the delay detection result, and ensure the smoothness of the system. In addition, by detecting the delay of the message in the thread, a delay condition of each message in the thread may be accurately obtained, so that the granularity of the message delay detection may be finer, and accuracy of message delay positioning may be improved.

These are explained in detail below, respectively. It should be noted that the description order of the following embodiments is not intended to limit a preferred order of the embodiments.

Figure 2:
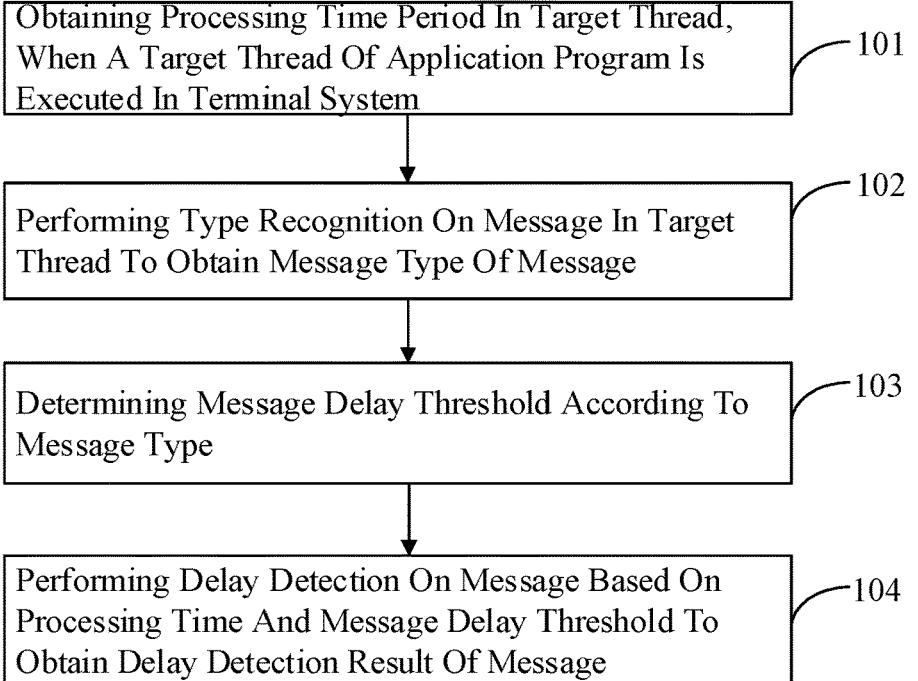
FIG. 2 is a schematic flow diagram of a method of detecting message delay according to an embodiment of the present application.

FIG. 2 is a schematic flowchart of a method of detecting the message delay according to an embodiment of the present application. The method of detecting the message delay includes the steps S101, S102, S103, and S104.

At Step S101, when a target thread of an application program is executed in a terminal system, a processing time period corresponding to a message in the target thread is obtained.

The terminal system is located between hardware and software of the electronic device and is responsible for managing software and hardware resources of a computer and providing a running environment for the application program. The terminal system mainly includes a mobile terminal operating system, for example, an Android operating system, an Apple (iOS) operating system, an Microsoft (windows) operating system, a Linux operating system, or the like.

Here, the application program refers to a computer program for performing one or more specific tasks, which runs in a user mode, may interact with a user, and has a visual user interface. For example, the application program may be a video application, a game application, a payment application, a search application, or the like.

The target thread is a thread executed by the application program in the terminal system at runtime. The thread is the minimum unit that the operating system may operate. The thread is essentially a piece of instruction (also program code), and the operating system executes the thread to complete the traffic logic of the application program. For example, a thread in an Android system includes a main thread and a sub-thread.

Here, in an embodiment of the present application, the message is an object that are processed during the execution of the thread, and the terminal system completes communication by sending the message. For example, the message type of the message may include a general message, a drawing message, a lifetime message, or the like.

In an embodiment of the present application, an Android operating system is described as an example, and other terminal systems may be described by referring to the Android operating system. For example, each application program in the Android operating system has a thread at the time of startup, and the thread may execute a drawing operation, and may also execute other operations. However, if the code of the application is not standardised, execution of the message in the thread may be time-consuming. In addition, since the messages in the thread are all processed sequentially, if one of the pieces of the message is time-consuming in the processing process, processing of the subsequent message may be affected. Finally, the operation of the entire application program may be affected, and a phenomenon such as stalling or frame loss may occur. However, in conventional delay detection on the entire thread, the delay of the entire thread may be only detected, but a specific reason why the application program stalls may be not obtained. For example, it is not possible to get to know exactly which processing of the message is delayed, or it is difficult to find out which process in the processing of the thread is delayed, and it is not easy to make quick and targeted adjustments. Therefore, the processing of each message in the thread needs to be detected. The most direct way to detect the delay of each message in the thread is to obtain the processing time period of the message, and determine whether the processing time period times out.

The processing time period of the message may be a time consumed by the message in each processing process of the thread, a time occupied by two or more consecutive processing processes, or a processing delay time of respective processing processes.

Figure 3:
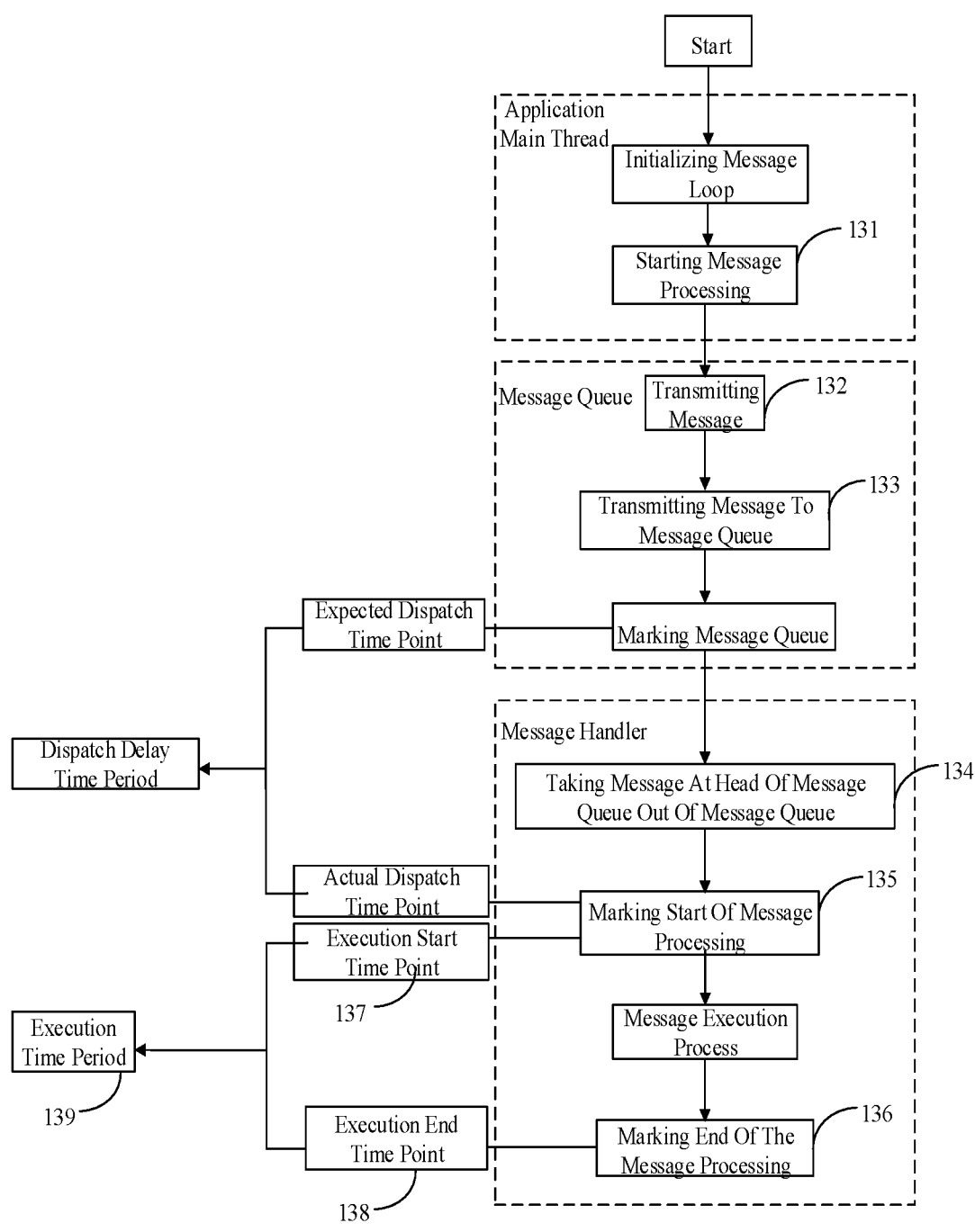
FIG. 3 is a flowchart of obtaining a processing time period of a message in method of detecting message delay according to an embodiment of the present application.

For example, referring to FIG. 3, each Android thread has a message queue for storing messages to be executed. The execution flow of the Android thread may refer to Step 131 to Step 134.

Step 131, the message is processed before the message enters the message queue, for example, initializing the message loop (Looper.prepareMainLooper) and obtaining messages in a loop (Looper.loop).

Step 132, the obtained message is transmitted (Handler.sendMessage).

Step 133, the message is transmitted to the message queue (MessageQueue.enqueueMessage).

Step 134, the messages is taken out of the message queue to be performed, for example, the message at the head of the message queue is extracted from the message queue (MessageQueue.next).

In an embodiment of the present application, if there is no message in the message queue, the thread enters a sleep state, the process of removing the message from the message queue is the dispatch of the message, and the execution process is the execution of the message. Therefore, the processing time period of the message may be the dispatch time period and the execution time period of the message. since there may be a delay in the dispatching of the message in the thread from the message queue, that is, the message is not dispatched per the expected dispatching time, the processing time period of the message may also be the dispatch delay time period or the like. The above examples should not be construed as a limitation of the embodiments of the present application.

The processing time period of the message may be obtained in various ways. For example, timing is performed at the start of message processing, and the message processing end time is obtained at the end of message processing. The message processing end time is the processing time period of the message.

Alternatively, as shown in FIG. 3, the obtaining of the message processing time period of the message may refer to Step 135 to Step 139.

Step 135, the start of message processing is marked or monitored (LooperMonitor.markDispatch); and Step 136, the end of the message processing is marked or monitored (LooperMonitor.markFinish).

The message processing start time and the message processing end time are respectively recorded by the above-mentioned marking or monitoring method, and the calculating of the message processing time period by using the time points of start and end of the message processing includes Step 137 to Step 139.

Step 137, a message execution start time point is recorded.

Step 138, a message execution end time point is recorded.

Step 139, the execution time period of the message is calculated by using the message execution start time point and the message execution end time point.

Here, the above example regarding the obtaining of the processing time period of the message is merely one of the implementation and should not be construed as limiting the embodiments of the present application.

Figure 4:
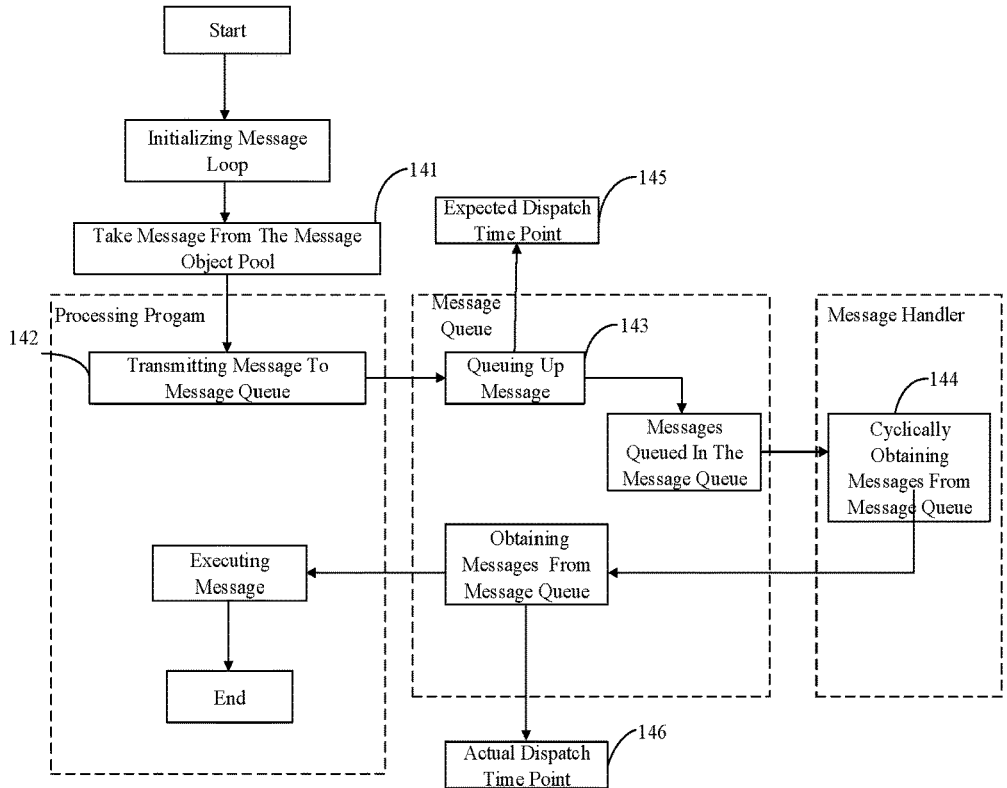
FIG. 4 is a flowchart of obtaining a dispatch delay time period of the message in a method of detecting message delay according to an embodiment of the present application.

For example, referring to FIG. 4, in an Android system, a process in which a message is dispatched from the message queue (MessageQueue) may refer to Step 141 to Step 144.

Step 141, a piece of message is obtained cyclically from the message object pool (Message.obtain).

Step 142, the obtained message is transmitted to the message queue (sendMessage).

Step 143, the message entering the message queue is queued up in an order in which they are expected to be dispatched (enqueueMessage).

Step 144, the message is obtained from the message queue by the message handler according to an expected dispatch time cycle (Looper.loop).

In an embodiment of the present application, a delay in the processing of a previous message in a thread affects the dispatch of next message, so that the dispatching of the next message is delayed. That is, the processing time period of the message includes the dispatch delay time period of the message. When the processing time period of the message includes the dispatch delay time period of the message in dispatching the message from the message queue of the target thread, the message dispatching may be monitored, and the actual dispatching time point of the message is obtained, that is, optionally, in some embodiments, when the target thread of the application program in the terminal system is executed, the obtaining of the processing time period corresponding to the message in the target thread may include Step 145 to Step 146.

Step 145, an expected dispatch time point at which a message is to be dispatched from the message queue is determined when the message in the target thread enters the message queue.

Step 146, an actual dispatch time point at which the message is dispatched from the message queue is obtained, when a message in the target thread is dispatched from the message queue.

The dispatch delay time period of the message is generated according to the actual dispatch time point and the expected dispatch time point.

In an embodiment of the present application, based on the expected dispatching time point and the actual dispatching time point at which the message is dispatched from the message queue, the dispatch delay time period of the message may be obtained. That is, the dispatch delay time period may be used as a reference object to determine whether the dispatching of the message in the thread is delayed. That is, when the dispatch delay time period times out, it can be determined that the dispatching of the message is delayed. The expected dispatching time period is set when the message enters the message queue. That is, when the expected dispatching time period is satisfied, the message is dispatched from the message queue, and this set time is obtained. The actual dispatching time point is obtained when the message is dispatched from the message queue. The actual dispatching time point may be obtained by monitoring the message in real time when the message leaves from the message queue. The dispatch delay time period of the message may be obtained by calculating the difference between the actual dispatching time point and the expected dispatching time point. The method of obtaining the dispatch delay time period is fast and accurate.

Figure 5:
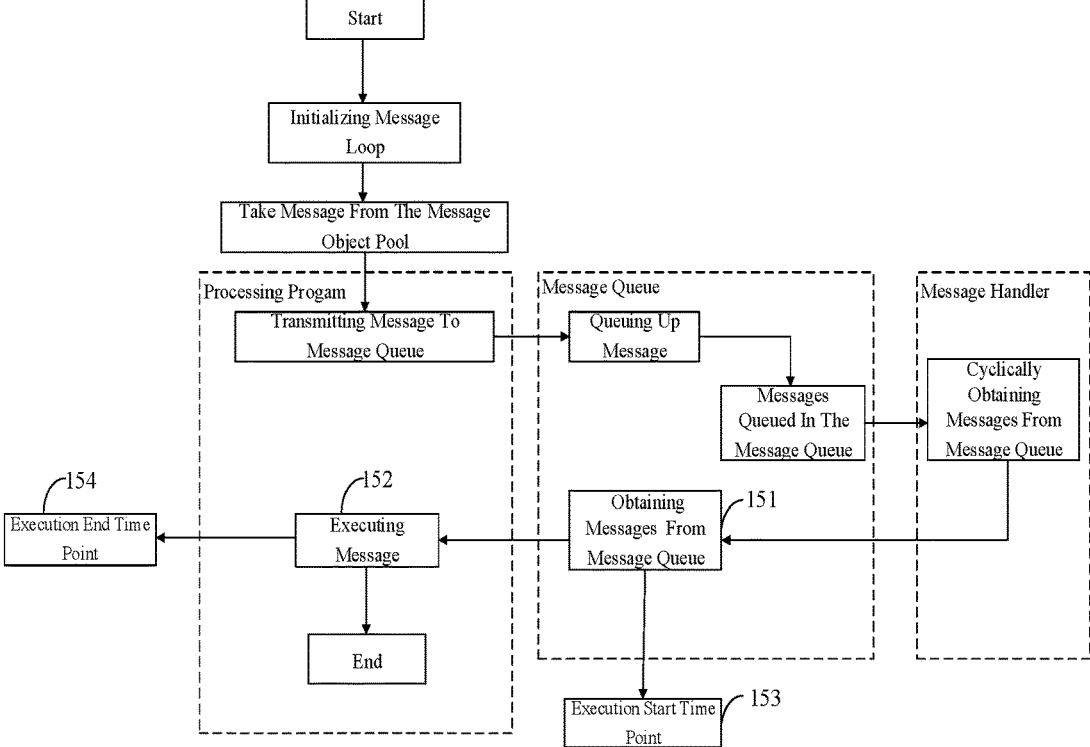
FIG. 5 is a flowchart of obtaining an execution time period of the message in a method of detecting message delay according to an embodiment of the present application.

Referring to FIG. 5, the executed process of the message in an Android thread includes Step 151 and Step 152.

Step 151, a piece of message is obtained cyclically from the message queue (MessageQueue.next).

Step 152, the obtained message is executed (handMessage).

In the embodiment of the present application, the time for executing the message is the execution time period of the message. When the processing time period of the message includes the execution time period during which the message is executed after the message is dispatched from the message queue of the target thread, the time points at which the message execution starts and ends may be monitored and obtained. Then, the execution time period of the message is calculated according to the time points at which the message execution starts and ends That is, alternatively, in some embodiments, when the target thread of the application program in the terminal system is executed, the obtaining of the processing time period corresponding to the message in the target thread includes Step 153 and Step 154.

Step 153, an execution start time point of the message is obtained when the message in the target thread start to be executed after being dispatched.

Step 154, an execution end time point of the message is obtained when the message execution ends.

The execution time period of the message is generated according to the execution start time point and the execution end time point.

In an embodiment of the present application, the obtaining of the execution end time point may be monitored and obtained in real time at the end of execution of the message. The obtaining of the execution start time point may be monitored and obtained in real time at the start of the execution of the message. The difference between the execution start time point and the execution end time point is calculated. The difference is the execution time period of the message. In addition, the execution time period obtained by using the difference between the execution start time point and the execution end time point is more accurate and convenient.

The execution of the message starts immediately after the message is dispatched from the thread. Therefore, the actual dispatching time point at which the message is dispatched from the thread is the execution start time point of the message. Therefore, the time obtained when the message is dispatched from the message queue can be used as both the actual dispatching time and as the execution start time of the message.

Step 102, type recognition is performed on the message in the target thread to obtain a message type of the message.

In an embodiment of the present application, when the application program is executed, data loading or various drawing of the interface is completed based on the execution of the thread, and the interface is differently processed for messages of different types in the thread, and the processing time period is different for the messages of the different types. The recognition of the type of the messages helps to determine the processing time period of the message in the normal condition.

The message type of the message may be determined based on a unique identification of the message. That is, alternatively, in some embodiments, the performing of the type recognition on the message in the target thread to obtain the message type of the message may include:

recognizing a message identification of the message and a processing thread type of the message; and determining the message type of the message according to the message identification and the processing thread type.

The message identification includes a message number or a message unique code (message ID), and the message identification is used to uniquely identify the message. The types of processing threads of the messages of different types are different, so that the message type of the message may be determined according to the message identification and the type of the processing thread of the message.

For example, in an embodiment of the present application, the message type of the message may be determined according to a mapping relationship among the message identification, the processing thread type, and the message type, or a part of a message type set may be determined according to the message identification, and then a unique message type is determined from the above set according to the processing thread type of the message, and the like. The above example should not be construed as a limitation on the embodiment of the present application.

Step 103, a message delay threshold corresponding to the message is determined according to the message type.

The processing time period of different messages in the thread may be different when the application program is executed. If the message delay thresholds of all the messages in the thread are set to be the same, the detection result obtained by detecting the message delay is inaccurate. For example, if the message delay thresholds of some messages with shorter processing time period are set to be larger, the delay detection result indicates that the message, which has been delayed, is not delayed because the delayed time is still less than the message delay threshold. On the contrary, if the message delay thresholds for some messages with longer processing time period are set to be less, the output delay detection result may represent that the message has been delayed because the processing time period for the message is greater than the message delay threshold. However, in fact, the message with the processing time period longer than the message delay threshold does not been delayed. Therefore, when the message delay thresholds of all the messages in the thread are set to be the same, the message delay detection result obtained by detecting the message delay is inaccurate.

However, the processing time periods for the messages of the same message type have a fixed value. Therefore, when the message delay threshold of a message is set, the message delay thresholds of the messages of the different types may be set according to the message type.

Here, the message delay threshold may be understood as the maximum value of the processing time period for the message being processed normally. When the processing time period of the message is greater than or equal to the message delay threshold, the processing time period of the message is considered to be timeout, that is, the processing of the message is delayed.

There are a plurality of methods for determining the message delay threshold of the message according to the message type of the message. For example, the message delay threshold corresponding to the message type may be determined according to the mapping relationship between the message type and the message delay threshold. Alternatively, the message delay threshold interval corresponding to the message type may be determined first, and then the message delay threshold corresponding to the message is determined from the message delay threshold interval. That is, alternatively, in some embodiments, the determining of the message delay threshold corresponding to the message according to the message type may include:

obtaining a mapping relationship set including a mapping relationship between a preset message type and a preset message delay threshold, where the mapping relationship set includes one or more relationships between one or more preset message types and the message delay thresholds respectively corresponding to the message types; and determining a message delay threshold corresponding to the message according to the mapping relationship set and the message type of the message.

After obtaining the mapping relationship set between the message type and the message delay threshold, the message delay threshold corresponding to the message is determined from the mapping relationship set according to the recognized message type of the message.

The unique correspondence between the message type and the message delay threshold may be determined by establishing the mapping relationship between the message type and the message delay threshold. After the message type is obtained, the message delay threshold corresponding to the message type may be obtained directly and quickly. The method of obtaining the message delay threshold is fast and accurate.

In the mapping relationship set, the message delay threshold corresponding to the message type is usually set according to the experience or the customary criteria of the maintenance personnel. Therefore, the message delay threshold corresponding to the message type is usually a fixed value. However, in actual development or application, due to different code writing criteria or writing habits may cause fluctuations in the processing time period of the message in the thread. Therefore, the fixed message delay threshold may no longer be applicable, or is limited to a larger extent. Therefore, each message type may correspond to a message delay threshold interval, and a value may be selected from the message delay threshold interval of the message according to certain conditions as the message delay threshold of the message. That is, alternatively, in some embodiments, the determining of the message delay threshold corresponding to the message according to the message type of the message may include:

determining a message delay threshold interval corresponding to a message type of the message; and determining the message delay threshold corresponding to the message from the message delay threshold interval based on a delay frequency at which a delay occurs for the message type.

The message delay threshold interval may be designed based on the experience of the maintenance personnel. For example, a value interval (that is, a message delay threshold interval) of a message delay threshold is determined in a relatively concentrated data range, based on the processing time period of a message of the same type in the past experience.

Here, the message delay frequency refers to the frequency at which the message is delayed. By calculating the frequency at which messages of the same type as said message is delayed, it can be known whether said message of this type is frequently delayed. The message delay may be caused by the unreasonable design of the code block for the message sending or executing process in the thread, or may be caused by the unreasonable setting of the message delay threshold. Therefore, the setting or selection of the message delay threshold may be designed to ensure that the message delay threshold is reasonably set if the code block is reasonably designed. For example, in an embodiment of the present application, the message delay threshold with a lower delay frequency may be selected by selecting the message delay threshold based on a delay frequency.

That is, alternatively, in some embodiments, the determining of the message delay threshold corresponding to the message from the message delay threshold interval based on the delay frequency at which delays occur for the message type may include:

selecting an initial message delay threshold from the message delay threshold interval;

recording a delay frequency at which a delay occurs for the message type; and adjusting the initial message delay threshold within the message delay threshold interval based on the delay frequency to obtain the message delay threshold corresponding to the message.

For example, in an embodiment of the present application, after the message delay threshold interval is determined by the message type, an initial message delay threshold may be selected from the message delay threshold, and then a specific value of the initial message delay threshold in the interval is adjusted according to the delay frequency at which a delay occurs for the message type, to obtain the message delay threshold of the message. For example, if the delay frequency at which the delay occurs for such a message type is high, it may be because the value of the initial message delay threshold is set lesser, and the value of the initial message delay threshold may be appropriately adjusted within the range of the original interval to obtain the final message delay threshold. On the contrary, if the delay frequency of the message at which the delay occurs for such a message type is less, it is possible that the value of the initial message delay threshold may be appropriately decreased within the range of the original interval because the value of the initial message delay threshold is set greater. where the increased or decreased amplitude of the value of the initial message delay threshold may also be set according to the delay frequency. An adjusted amplitude of the initial message delay threshold may be appropriately increased when the delay frequency is high or low (for example, the increased scale or decreased scale for the initial message delay threshold is increased). The adjusted amplitude of the initial message delay threshold may be appropriately decreased or even the adjustment for the initial message delay threshold is stopped when the delay frequency approaches the expected value and the fluctuation of the change thereof is not significant. By adjusting the initial message delay threshold, the delay frequency corresponding to the message type tends to be in a stable state and the delay frequency value is lower. The message delay threshold obtained by adjusting the initial message delay threshold according to the delay frequency of the message ensures that each message type may correspond to an accurate message delay threshold.

The message delay thresholds corresponding to the messages of the same message type in dispatching and execution of the messages may be different from each other. Therefore, it is also possible to set, for the dispatching of a message, a message dispatch delay threshold corresponding to the message type at the time of dispatching and, for the execution of a message, a message execution delay threshold corresponding to the message type at the time of execution. That is, the same message type may correspond to different message delay thresholds at the time of dispatching and execution, respectively. That is, alternatively, in some embodiments, the determining of the message delay threshold corresponding to the message according to the message type may include:

obtaining a mapping relationship set including a mapping relationship among a preset message type, a preset message-processing manner, and a preset message delay threshold;

identifying a processing manner of the message to obtain the message-processing manner of the message; and determining the message delay threshold corresponding to the message based on the mapping relationship set, the message type, and the message-processing manner.

In an embodiment of the present application, the message processing method may include message dispatching or execution. Other processing methods may be included for different message types, which is not limited herein.

In an embodiment of the present application, the mapping relationship between the message type, the message-processing manner, and the message delay threshold is established, so that messages of different message types may all correspond to a message delay threshold in different message-processing manners. For example, the same message type corresponds to a message dispatch delay threshold when the message type is dispatched and a message execution delay threshold when the message is executed. The message delay threshold is determined according to the message type and the message-processing manner of the message, so that the determination of the message delay threshold more accurate.

Step 104, delay detection is performed on the message based on the processing time period and the message delay threshold to obtain a delay detection result of the message.

The message delay detection result includes may include delay in the message processing or normal in the message processing. When the processing time period of the message is greater than or equal to the message delay threshold value of the message, the message delay detection result indicates the delay in the message processing. Otherwise, the message processing is normal.

The processing time period of the message includes the dispatch delay time period of the message in dispatching the message from the message queue of the target thread and an execution time period during which the message is executed after being dispatched from the message queue. When the dispatching delay time period of the message (that is, the difference between the actual dispatching time point and the expected dispatching time point) is greater than or equal to the message delay threshold value of the message, the dispatching of the message is considered to be timeout. Otherwise, the dispatching of the message is not timeout. When the execution time period of the message (that is, the difference between the execution end time point of the message and the execution start time point) is greater than or equal to the message delay threshold of the message, the execution of the message is considered to be timeout, that is, the execution of the message is delayed, and otherwise, the execution of the message is not delayed.

In an embodiment of the present application, the message type of the message includes a general message, a drawing message, or a lifetime message. The general message refers to a message that has no characteristic in the message queue, which is different from the drawing message and the lifetime message. The drawing message refers to a message used to complete a drawing operation when an application program runs. The lifetime message refers to a message that has a lifetime in the processing process of the message. The lifetime message refers to status information of each stage of the message in a thread processing process. According to different applications or requirements, the types of the messages in the thread are different or more finely divided. The types of the message types are not specifically limited herein.

In an embodiment of the present application, when the message type in the thread is the drawing message, the drawing message further includes a single drawing message and a plurality of continuous drawing messages. The single drawing message means that the single message may complete the drawing operation, and the plurality of continuous drawing messages means that the continuous drawing operation is completed by dispatching and executing the plurality of continuous messages. The delay detection of the single message in the plurality of continuous drawing messages and the single drawing message is the same as the ordinary message or the lifetime message, and the calculation of the dispatch delay time period and the execution time period of the single message in the plurality of continuous drawing messages and the single drawing message may be obtained by referring to the above calculation method.

In an embodiment of the present application, for the plurality of continuous drawing messages, there may be continuous execution time periods during which the continuous processing of the plurality of messages needs to be continuously completed. However, the plurality of continuous drawing messages do not have a higher requirement for the smooth processing of one or two of them during the drawing process, and they may allow one or two of them to be delayed during processing. Therefore, for the plurality of continuous drawing messages, a delay number threshold for the delay of the message may be set, and the delay detection result is determined to be the delay of the message only when the delay number threshold has been reached. That is, in some embodiments, the performing of the delay detection on the message based on the processing time period and the message delay threshold to obtain the delay detection result of the message may include:

when the message type is a plurality of continuous drawing messages, obtaining a total expected processing time period of the plurality of consecutive drawing messages;

determining a total message number of the plurality of continuous drawing messages based on the total expected processing time period;

obtaining a processing time period and a message delay threshold of each of the plurality of continuous drawing messages and performing delay detection on each of the plurality of continuous drawing messages;

recording a number of delayed messages in the plurality of continuous drawing messages for which the delay has occur;

obtaining an association relationship between the preset total message number of messages and the preset delay number threshold;

obtaining a delay number threshold corresponding to the plurality of consecutive drawing messages according to the total message number and the association relationship; and obtaining delay detection results of the plurality of continuous drawing messages according to the total message number and the delay number threshold.

For example, for the plurality of continuous drawing messages, the continuous drawing time period is 2 s, and 120 frames (that is, 120 messages) are to be drawn within 2 s. The average processing time period of each frame is 16.66 ms. Therefore, as long as the processing time period of one of the frames is greater than 16.66 ms, the plurality of continuous drawing messages will lose frames, but the influence of a less amount of lost frames on the overall drawing is very small. Therefore, for a plurality of continuous drawing messages, the drawing timeout of a single frame may indicate that the message is not delayed in the obtained delay detection result. However, when the drawing timeout of a plurality of frames occurs in the continuous drawing message, there is an obvious impact on the overall continuous drawing. Therefore, the delay number threshold for the timeout of the processing time period of the plurality of frames is set in the present application for the plurality of continuous drawing messages. For example, the delay number threshold is set to 30, that is, the number of frames that are timeout in 2 s is more than or equal to 30, and the output delayed detection result for the plurality of continuous drawing messages is the delay of the message.

The specific value of the number of delay messages may be set according to the total number of messages of the plurality of continuous drawing messages. If the delay detection result of the plurality of continuous drawing messages is that the delay frequency of the message delay is relatively higher, the delay number threshold may be appropriately adjusted. For example, if the delay frequency is relatively higher, the delay number threshold may be appropriately increased. Otherwise, if the delay frequency is relatively lower, the delay number threshold may be appropriately reduced in order to more accurately detect the delay.

Figure 6:
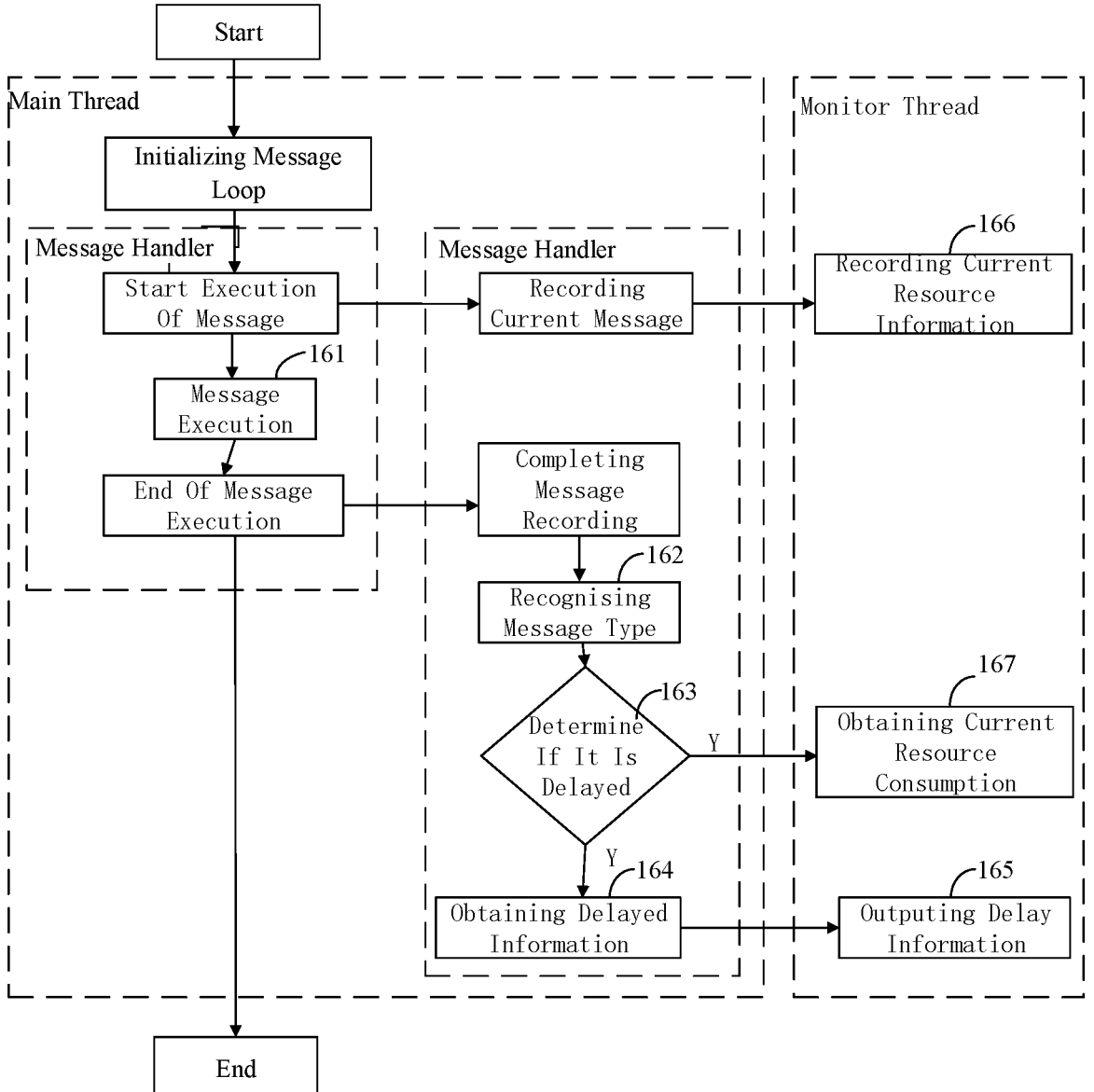
FIG. 6 is a flowchart of obtaining delay information of a delay message in a method of detecting message delay according to an embodiment of the present application.

Referring to FIG. 6, the processing of a message in a thread is detected. When it is detected that a delay has occurred in the processing of the message, delay information related to the delay message is obtained. For example, the detection of the execution of the message is described as an example. The detection including:

Step 161, performing execution of the message;

Step 162, recognizing a message type of the message, and determining a message delay threshold of the message according to the message type of the message;

Step 163, determining whether the execution of the message is delayed, for example, determining whether the execution of the message is delayed by comparing a execution time period and the message delay threshold;

Step 164, in response to determining that the execution of the message is delayed, recording a delay message indicating that a delay has occurred, and obtaining delay information related to the delay message;

Step 165, outputting the delay information to the terminal together.

When a delay occurs in the message processing, delay information associated with the delayed message may be obtained to ensure accurate localization of the message delay. That is, alternatively, in some embodiments, the method further includes:

If the delay detection result of the message is that the message is delayed, obtaining device information of a device running the application program and delay information of the message which is delayed; and outputting the device information and the delay information.

The maintenance personnel may adjust the specific code block in the thread according to the device information and the delay information, so that the maintenance personnel may quickly find the specific cause of the delay, accelerate the processing of the delay, and ensure the smoothness of running the application program.

The delay information includes a time point at which the lag occurs, a name of the process in which the lag occurs, application version information, a lag type, a sender of a lag message, a receiver of a lag message, a message number of a lag message, lag duration information, method stack information, system resource information, and/or the like. When the message type is a plurality of continuous drawing messages, the delay information further includes view information (View), environment information, and the like.

The lag duration information is the message processing time period information. The sender of the lag message refers to an object (such as Handler in Android) that puts the message into the message queue or an object (such as Looper in Android) that takes the message out of the message queue. The receiver of the lag message refers to an object (such as Handler in Android) that receives the message. The message is executed in the thread in which the Handler is located by returning the delay information related to the delay message, so that the maintenance personnel may make timely and quick targeted adjustments. View class is a superclass of (Android) Android, and this class contains almost all screen types. Each View has a canvas for drawing. The canvas may be arbitrarily extended. The context information includes a thread ID, a code segment of a thread, a stack of threads, etc. Handler directly inherits Object, a Handler allows sending and processing of message (Message) or runnable interface objects, and is associated into the message queue (MessageQueue) of the main thread. Looper is for opening a message loop for a thread. The newly born thread in Android does not have a message loop by default (except for the main thread, for which the main thread system automatically creates a Looper object, which enables a message loop). The Looper object stores messages and events through the message queue (MessageQueue), and a thread may have only one Looper, which corresponds to a message queue (MessageQueue).

Different messages may use different resources. Therefore, in the case that the delay or lag occurs, the system resource information is recorded during the message processing. According to the occupation and consumption of system resources, it is helpful to locate what caused the delay or lag. That is, alternatively, in some embodiments, the obtaining of the system resource information of the message may include:

obtaining a system resource type of the message used when a message is dispatched or executed;

obtaining a total amount of resources corresponding to various system resource types before and after a message is dispatched or executed; and determining a consumption amount of consumption corresponding to the various system resource types before and after the message is dispatched or executed, according to the total amount of resources corresponding to various system resource types before and after a message is dispatched or executed.

The system resource information includes a system resource type and a consumption amount of the system resource. The resource type of the system includes a central processing unit (CPU) resource, an input/output (IO) resource, or a memory resource. By obtaining the system resource type, an occupation status of the system resource type when a message is delayed may be obtained. As shown in FIG. 6, the system resource type specifically includes:

Step 166, recording system resource information before and after a message is dispatched or executed; and Step 167, obtaining a system resource consumption amount before and after the message is dispatched or before and after the message is executed, according to the system resource information before and after a message is dispatched, or before and after a message is executed.

According to the calculation of the consumption amount of the system resources corresponding to each system resource type, the consumption condition of the system resources may be obtained for each system resource type, so that the specific causes of message delay or lag may be conveniently analyzed and located according to the occupation condition of the system resource type and the consumption amount of the system resource. The type of system resources occupied and the total amount of resources are also easy to be recognized and counted.

In some embodiments, since a plurality of messages are stored in the message queue of the thread, the messages are queued and stored in the message queue, one by one waiting to be dispatched and then executed. If a message in the thread is delayed in the processes of dispatching or execution, subsequent messages may also be delayed in the process of dispatching. Therefore, in this case, only the number of subsequent message dispatching timeouts and detail information (delay information) of delay messages causing a series of subsequent message dispatching timeouts may be recorded. In addition, there may be a larger time difference between the time points at which each message is expected to be dispatched in the message queue, so there is also a case where a delay occurs in the dispatch of a previous message while the dispatch of the next message is normal. For example, if the expected dispatching time point of the previous message is eight o'clock, the dispatch delay time period is 50 ms, and the expected dispatching time point of the next message is 8:01 (eight o'clock and one minute), the dispatch delay of the previous message does not affect the dispatch of the next message. That is, since the time difference between the dispatching time point of the subsequent message and the dispatch time point of the previous message is greater than the dispatch delay time period of the previous message, the dispatch of the subsequent message is not delayed due to the dispatch delay of the previous message.

In an embodiment of the application, different message delay thresholds are set for respective messages of different message types in the thread, and thus each message may correspond to one message delay threshold. The setting of the message delay threshold for each message in the present application is more favorable for accurate detection of the delay of each message, and a message delay detection result is obtained according to the message delay threshold and the processing time period of the message. When the processing time period of the message is greater than or equal to the message delay threshold, the message delay detection result is determined to be that the message is delayed. Delay information associated with the delay message is collected after the message delay to facilitate a manager to determine the specific position and cause of the delay according to the delay information, and may quickly adjust the delay according to the delay information, thereby ensuring the smoothness of the system. In addition, in an embodiment of the present application, the delay of each message in the thread is accurately obtained by detecting the delay of the message in the thread during processing of the message, so as to make the granularity of the message delay detection finer and improve the accuracy of the message delay localization, e.g. to accurately detect which message' dispatch or execution in the thread causes the delay.

The method according to an embodiment of the application will be exemplified below.

In the present embodiment, the apparatus of detecting message delay integrated in the server is described as an example.

The method of detecting the message delay includes the steps S201, S202, S203, and S204.

At Step S201, when a target thread of an application program is executed in a terminal system, a processing time period corresponding to a message in the target thread is obtained by the server.

It should be noted that the processing time period of the message includes a dispatch delay time period of the message at which the message is dispatched from a message queue of the target thread or an execution time period during which the message is executed after being dispatched from the message queue of the target thread.

When the processing time period of the message is the message dispatch delay time period, the server sets and records the expected dispatch time point of the message when the message enters the message queue. When the message is dispatched from the message queue, that is, when the message is dequeued from the message queue, the server records the actual dispatch time point of the message. Finally, the server calculates a difference value between the actual dispatch time point of the message and the expected dispatch time point, and determines the difference value as the dispatch delay time period by which the dispatch of the message is delayed.

In an embodiment of the present application, the processing time period of the message is the execution time period of the message. The server records the time point at which the server starts to execute the message, that is, when the message is dispatched from the message queue, and determines the time point as the execution start time point of the message. The server records the time point at which the execution of the message ends, and determines the time point as the execution end time point of the message. Finally, the server calculates a difference between the execution end time point of the message and the execution start time point, and determines the difference as the execution time period of the message execution.

Step 202, type recognition is performed by the server on the message in the target thread to obtain a message type of the message.

For example, the server may extract the message identification (e.g., message number or message unique encoding) and the type of message processing thread from the processed message, and determine the type of message based on the message identification and the type of message processing thread.

Step 203, a message delay threshold corresponding to the message is determined according to the message type.

The processing time period of different messages in a thread may be different. If the message delay thresholds of all the messages in the thread are set to be the same, there will be the problem of inaccurate detection results when detecting message delays. In addition, the processing time periods of the messages of the same type substantially have a certain fixed value. Therefore, when the message delay thresholds of the messages are set, the message delay thresholds corresponding to the messages of different types may be divided according to the message types. That is, the message delay thresholds corresponding to the messages of different types are set according to the message types. The message delay threshold of each message type are set according to the actual application or requirements, and stored in the server, and then the server, after receiving the message, recognizes the type of message, and obtains the message delay thresholds corresponding to the type of message according to the type of message.

The message delay threshold may be a fixed value having a one-to-one mapping relationship with the message type, or may be an interval. If the message delay threshold is the interval, a message delay threshold for determining the delay of the message is a value selected as the interval. The selection of the message delay threshold may be adjusted according to the delay frequency at which the message type is delayed.

Step 204, delay detection is performed on the message based on the processing time period and the message delay threshold to obtain a delay detection result of the message.

In an embodiment of the present application, the server obtains the delay detection result of the message according to the processing time period of the message and the message delay threshold value corresponding to the message, and obtains the final delay detection result after comparing the processing time period with the message delay threshold value. For example, after the processing time period of the message is greater than or equal to the message delay threshold value of the message, the server determines that the message is delayed, outputs delay information related to the delay of the message, and outputs the delay information to the terminal. The maintenance personnel analyze and adjusts the code block in which the delay occurs according to the delay detection result and the delay information output by the server.

In an embodiment of the application, different message delay thresholds are set for respective messages of different message types in the thread, and thus each message may correspond to a corresponding one of the message delay thresholds. The setting of the message delay threshold by the server for each message in the present application is more favorable for accurate detection of the delay of each message, and a message delay detection result is obtained by the server according to the message delay threshold and the processing time period of the message. By comparing the message delay threshold with the processing time period of the message, the server determines whether the delay has occurred in the processing of the message in the thread. After detecting that the delay has occurred for the message, the server can return the delay information of the delay message, to facilitate a manager to determine the specific position and cause of the delay according to the delay information and the detection result, and to quickly adjust the position (including the specific code block and the like) of the delay, thereby ensuring the smoothness of the system. In addition, the delay of each message in the thread is accurately obtained by the server by detecting the delay of the message in the thread during processing of the message, so as to make the granularity of the message delay detection finer and improve the accuracy of the message delay localization.

To facilitate better implementation of the method of detecting message delay according to an embodiment of the present disclosure, the present disclosure further provides an apparatus of detecting message delay. The meaning of the word and the term is the same as that in the method of detecting message delay described above. For details, reference may be made to the description in the method embodiment.

Referring to FIG. 8, FIG. 8 is a schematic structural diagram of an apparatus of detecting message delay according to the present application. The apparatus of detecting message delay may include an obtaining module 301, a recognition module 302, a determination module 303, and an analysis module 304. Alternatively, a feedback module 305 may further be included.

The obtaining module 301 is configured to obtain a processing time period corresponding to a message in a target thread, when the target thread of an application program is executed in a terminal system.

The processing time period includes a dispatch delay time period of the message in dispatching the message from a message queue of the target thread, and the obtaining of the processing time period corresponding to the message in the target thread is configured to:

determine an expected dispatch time point at which the message is dispatched from the message queue, upon the message in the target thread enters the message queue;

obtain an actual dispatch time point at which the message is dispatched from the message queue upon the message is dispatched from the message queue; and generate the dispatch delay time period of the message based on the actual dispatch time point and the expected dispatch time point.

The processing time period includes an execution time period of the message during which the message is executed after being dispatched from a message queue of the target thread, and the obtaining of the processing time period corresponding to the message in the target thread is configured to:

obtain an execution start time point of the message when the message in the target thread starts to be executed after being dispatched;

obtain an execution end time point of the message when message execution ends; and generate the execution time period of the message based on the execution start time point and the execution end time point.

The recognition module 302 is configured to perform type recognition on the message in the target thread to obtain a message type of the message.

The determination module 303 is configured to determine a message delay threshold corresponding to the message based on the message type.

In some embodiments of the present disclosure, the determination module 303 may include:

a first obtaining unit, configured to obtain a mapping relationship set including a mapping relationship between a preset message type and a preset message delay threshold; and a first determination unit, configured to determine the message delay threshold corresponding to the message based on the mapping relationship set obtained by the first obtaining unit and the message type recognized by the recognition module.

In some embodiments of the present disclosure, the determination module 303 further includes:

a second determination unit, configured to determine a message delay threshold interval corresponding to the message type; and a third determination unit, configured to determine the message delay threshold corresponding to the message from the message delay threshold interval based on a delay frequency at which a delay occurs for the message type.

In some embodiments of the present disclosure, the third determination module includes:

a selection subunit, configured to select an initial message delay threshold from the message delay threshold interval;

a recording subunit, configured to record a delay frequency at which the delay occurs for the message type; and an adjustment subunit, configured to adjust the initial message delay threshold within the message delay threshold interval based on the delay frequency to obtain the message delay threshold corresponding to the message.

The analysis module 304 is configured to perform delay detection on the message based on the processing time period and the message delay threshold to obtain a delay detection result of the message.

Alternatively, in some embodiments of the present disclosure, the apparatus of detecting message delay further includes a feedback module 305, and the feedback module further includes:

a second obtaining unit, configured to obtain device information of a device running the application program and delay information of the message which is delayed, in response that the delay detection result of the message is that the message is delayed; and a first output unit, configured to output the device information and the delay information in an embodiment of the application, In the present application, the obtaining module 301 obtains the processing time period of the message in the target thread, upon determining that the application program is executed. The recognition module 302 extracts the message type. The determination module 303 determines the message delay threshold of the message according to the message type of the message. The analysis module 304 generates a delay detection result of the message according to the processing time of the message and the message delay threshold of the message The message delay detection result may be that the message is delayed or the message is not delayed. In response to determining that the message delay detection result is that the message is delayed, the feedback module 305 may be configured to output delay information indicating that the message is delayed, so that the maintenance personnel may conveniently obtain the delay information and accurately locate the message delay according to the delay information. The message delay detection scheme provided in the present application determines the message delay threshold value of the message by using the message type of the message, so that each message corresponds to a corresponding one of the message delay threshold values. The setting of the message delay threshold value for each message in the present application facilitates accurate detection of the delay of each message. In addition, by detecting the delay of the message in a thread during processing, a processing condition of each message in the thread can be accurately obtained, so that the granularity of the message delay detection is finer.

Figure 9:
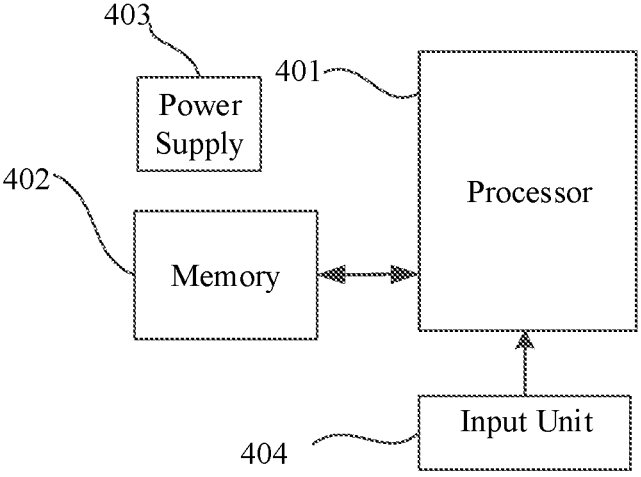
FIG. 9 is a schematic block diagram of an electronic device according to an embodiment of the present application.

An embodiment of the present disclosure further provides an electronic device, as shown in FIG. 9, showing a schematic block view of an electronic device according to an embodiment of the present disclosure. The computer device may be a terminal.

The electronic device may include components such as a processor 401 of one or more processing cores, a memory 402 of one or more computer-readable storage media, a power supply 403, an input unit 404, or the like. It will be appreciated by those skilled in the art that the computer device shown in FIG. 9 does not limit the electronic device in the present disclosure, and the electronic device may include more or less components than illustrated, or may combine certain components, or different component arrangements.

The processor 401 is a control center of the electronic device, is connected to various parts of the entire electronic device by various interfaces and lines, and performs various functions and processes data of the electronic device by running or executing software programs and/or modules stored in the memory 402, and invoking data stored in the memory 402, thereby monitoring the electronic device as a whole. Alternatively, the processor 401 may include one or more processing cores. In an embodiment, the processor 401 may be integrated with an application processor and a modem processor. The application processor generally processes an operating system, an object interface, an application program, or the like. The modem processor generally processes wireless communication. It will be appreciated that the above modem processor may not be integrated into the processor 401.

The memory 402 may be configured to store software programs and modules. The processor 401 executes various functional applications and data processing by running the software programs and modules stored in the memory 402. The memory 402 may mainly include a storage program area and a storage data area The storage program area may store an operating system, an application program (such as a sound play function, an image play function, or the like) required by at least one function, and the like. The storage data area may store data, or the like created according to use of the electronic device. In addition, the memory 402 may include high speed random access memory, and may further include non-volatile memory, such as at least one magnetic disk storage device, flash memory device, or other volatile solid state storage device. Accordingly, the memory 402 may further include a memory controller to provide access to the memory 402 by processor 401.

The electronic device further includes a power supply 403 for supplying power to the respective components. For example, the power supply 403 may be logically connected to the processor 401 through a power management system, so that functions such as charging, discharging, or power consumption management are managed through the power management system. The power supply 403 may further include one or more DC or AC power supplies, a recharging system, a power failure detection circuit, a power converter or inverter, a power status indicator, or any other component.

The electronic device may further include an input unit 404, and the input unit 404 is configured to receive input numeric or character information and to generate keyboard, mouse, joystick, or optical or trackball signal inputs in relation to user settings and functional control.

Although not shown, the electronic device may further include a display unit or the like, and details are not described herein. In an embodiment, the processor 401 in the computer device loads executable files corresponding to the processes of one or more application programs into the memory 402, according to the following steps, and the application programs stored in the memory 402 are executed by the processor 401, thereby implementing various functions.

The functions include: obtaining a processing time period used for message processing in a thread, extracting the message type and the processing manner of the message in the thread, and determining the delay threshold of the message in the corresponding processing manner according to the message type and the processing manner of the message in the thread. If the processing time period of the message in the processing manner is greater than or equal to the delay threshold corresponding to the message in the processing manner, the detection result for reflecting the delay of the message is returned. If the processing time period of the message in the processing manner is less than the delay threshold corresponding to the message in the processing manner, the detection result for reflecting the normal processing of the message is returned.

Reference may be made to the previous embodiments for a specific implementation of each of the above operations, and details are not described herein.

In an embodiment of the application, different message delay thresholds are set for the message types of the messages in the thread and the processing manners of the messages in the thread, and thus each message may correspond to a corresponding one of the message delay thresholds. The setting of the message delay threshold for each message in the present application is more favorable for accurate detection of the delay of each message, thereby avoiding occurrence of an unreasonable delay detection due to different processing times of respective messages. It is determined whether a delay occurs in the processing of the message in the thread by comparing the delay threshold with the processing time of the message. The delay information of the message (that is, the detection result) is returned, to facilitate a manager to determine the specific code block of the delay according to the delay information, and to quickly adjust the code block of the delay, thereby ensuring the smoothness of the system. In addition, the delay of each message in the thread is accurately obtained by detecting the delay of the message in the thread during processing of the message. Compared with the conventional detection of the processing of the entire thread, the detection granularity of the present disclosure is finer and the specific problem of thread sticking may be found.

It will be appreciated by those of ordinary skill in the art that all or a portion of the steps of one of the various methods according to the above-described embodiments may be performed by instructions, which may be stored in a computer-readable storage medium and loaded and executed by a processor, or by relevant hardware controlled by the instructions.

To this end, the present disclosure provides a storage medium having stored thereon a plurality of instructions that can be loaded by a processor, to perform the steps in any of the video co-shooting method of the volumetric video according to embodiments of the present disclosure. For example, the instruction may perform the following steps:

The steps include: obtaining a processing time period used for message processing in a thread, extracting the message type and the processing manner of the message in the thread, and determining the delay threshold of the message in the corresponding processing manner according to the message type and the processing manner of the message in the thread. If the processing time period of the message in the processing manner is greater than or equal to the delay threshold corresponding to the message in the processing manner, the detection result for reflecting the delay of the message is returned. If the processing time period of the message in the processing manner is less than the delay threshold corresponding to the message in the processing manner, the detection result for reflecting the normal processing of the message is returned.

Reference may be made to the previous embodiments for a specific implementation of each of the above operations, and details are not described herein.

The storage medium may include a read-only memory (ROM), a random access memory (RAM), a magnetic disk, an optical disk, or the like.

Since the instructions stored in the storage medium may perform the steps in any of the methods of detecting message delay according to embodiments of the present disclosure, the advantageous effects achieved in any of the methods of detecting message delay according to embodiments of the present disclosure may be realized. For details, refer to the foregoing embodiments, and details are not described herein.

The present application has been described in detail with reference to a method and an apparatus of detecting message delay, an electronic device, and a storage medium according to an embodiment of the present application. The principles and embodiments of the present application are described herein by using specific examples. The description of the above embodiments is merely provided to help understand the method and the core idea of the present disclosure. At the same time, variations will occur to those skilled in the art in both the detailed description and the scope of application in accordance with the teachings of the present disclosure. In view of the foregoing, the present description should not be construed as limiting the application.

What is claimed is:

1. A method of detecting message delay, comprising:
   obtaining a processing time period corresponding to a message in a target thread, when the target thread of an application program is executed in a terminal system;
   performing type recognition on the message in the target thread to obtain a message type of the message;
   determining a message delay threshold interval corresponding to the message type, wherein the message delay threshold interval is a predetermined time period corresponding to the message type;
   selecting an initial message delay threshold from the message delay threshold interval;
   recording a delay frequency at which a delay occurs for the message type;
   adjusting the initial message delay threshold within the message delay threshold interval based on the delay frequency to obtain a message delay threshold corresponding to the message; and performing delay detection on the message based on the processing time period and the message delay threshold to obtain a delay detection result of the message.

2. The method of claim 1, wherein the determining of the message delay threshold corresponding to the message based on the message type comprises:

obtaining a mapping relationship set comprising a mapping relationship between a preset message type and a preset message delay threshold; and determining the message delay threshold corresponding to the message based on the mapping relationship set and the message type.

3. The method of claim 1, wherein the determining of the message delay threshold corresponding to the message based on the message type comprises:

obtaining a mapping relationship set comprising a mapping relationship among a preset message type, a preset message-processing manner, and a preset message delay threshold;

recognizing a processing manner of the message to obtain a message-processing manner of the message; and determining the message delay threshold corresponding to the message based on the mapping relationship set, the message type, and the message-processing manner.

4. The method of claim 1, wherein the processing time period comprises a dispatch delay time period of the message in dispatching the message from a message queue of the target thread, and the obtaining of the processing time period corresponding to the message in the target thread comprises:

determining an expected dispatch time point at which the message is dispatched from the message queue, upon the message in the target thread enters the message queue;

obtaining an actual dispatch time point at which the message is dispatched from the message queue upon the message is dispatched from the message queue; and generating the dispatch delay time period of the message based on the actual dispatch time point and the expected dispatch time point.

5. The method of claim 1, wherein the processing time period comprises an execution time period of the message during which the message is executed after being dispatched from a message queue of the target thread, and the obtaining of the processing time period corresponding to the message in the target thread comprises:

obtaining an execution start time point of the message when the message in the target thread starts to be executed after being dispatched;

obtaining an execution end time point of the message when message execution ends; and generating the execution time period of the message based on the execution start time point and the execution end time point.

6. The method of claim 1, wherein the performing of the delay detection on the message based on the processing time period and the message delay threshold to obtain the delay detection result of the message comprises:

obtaining a total expected processing time period of a plurality of consecutive drawing messages, when the message type is the plurality of continuous drawing messages;

determining a total message number of messages of the plurality of continuous drawing messages based on the total expected processing time period;

obtaining a processing time period and a message delay threshold of each of the plurality of continuous drawing messages and performing delay detection on each of the plurality of continuous drawing messages;

recording a number of delayed messages in the plurality of continuous drawing messages for which the delay has occur;

obtaining an association relationship between preset total message number of messages and preset delay number threshold;

obtaining a delay number threshold corresponding to the plurality of consecutive drawing messages based on the total message number and the association relationship; and obtaining a delay detection result of the plurality of continuous drawing messages based on the total message number and the delay number threshold.

7. The method of claim 1, further comprising: after performing delay detection on the message based on the processing time period and the message delay threshold to obtain a delay detection result of the message, in response that the delay detection result of the message is that the message is delayed, obtaining device information of a device running the application program and delay information of the message which is delayed; and outputting the device information and the delay information.

8. An electronic device, wherein the electronic device comprises a memory, a processor, and a computer program stored in the memory and executable on the processor, wherein the processor, when executing the computer program, implements operations of a method of detecting message delay comprising:

obtaining a processing time period corresponding to a message in a target thread, when the target thread of an application program is executed in a terminal system;

performing type recognition on the message in the target thread to obtain a message type of the message;

determining a message delay threshold interval corresponding to the message type, wherein the message delay threshold interval is a predetermined time period corresponding to the message type;

selecting an initial message delay threshold from the message delay threshold interval;

recording a delay frequency at which a delay occurs for the message type;

adjusting the initial message delay threshold within the message delay threshold interval based on the delay frequency to obtain a message delay threshold corresponding to the message; and performing delay detection on the message based on the processing time period and the message delay threshold to obtain a delay detection result of the message.

9. The electronic device of claim 8, wherein the determining of the message delay threshold corresponding to the message based on the message type comprises:

obtaining a mapping relationship set comprising a mapping relationship between a preset message type and a preset message delay threshold; and determining the message delay threshold corresponding to the message based on the mapping relationship set and the message type.

10. The electronic device of claim 8, wherein the determining of the message delay threshold corresponding to the message based on the message type comprises:

obtaining a mapping relationship set comprising a mapping relationship among a preset message type, a preset message-processing manner, and a preset message delay threshold;

recognizing a processing manner of the message to obtain a message-processing manner of the message; and determining the message delay threshold corresponding to the message based on the mapping relationship set, the message type, and the message-processing manner.

11. The electronic device of claim 8, wherein the processing time period comprises a dispatch delay time period of the message in dispatching the message from a message queue of the target thread, and the obtaining of the processing time period corresponding to the message in the target thread comprises:

determining an expected dispatch time point at which the message is dispatched from the message queue, upon the message in the target thread enters the message queue;

obtaining an actual dispatch time point at which the message is dispatched from the message queue upon the message is dispatched from the message queue; and generating the dispatch delay time period of the message based on the actual dispatch time point and the expected dispatch time point.

12. The electronic device of claim 8, wherein the processing time period comprises an execution time period of the message during which the message is executed after being dispatched from a message queue of the target thread, and the obtaining of the processing time period corresponding to the message in the target thread comprises:

obtaining an execution start time point of the message when the message in the target thread starts to be executed after being dispatched;

obtaining an execution end time point of the message when message execution ends; and generating the execution time period of the message based on the execution start time point and the execution end time point.

13. The electronic device of claim 8, wherein the performing of the delay detection on the message based on the processing time period and the message delay threshold to obtain the delay detection result of the message comprises:

obtaining a total expected processing time period of a plurality of consecutive drawing messages, when the message type is the plurality of continuous drawing messages;

determining a total message number of messages of the plurality of continuous drawing messages based on the total expected processing time period;

obtaining a processing time period and a message delay threshold of each of the plurality of continuous drawing messages and performing delay detection on each of the plurality of continuous drawing messages;

recording a number of delayed messages in the plurality of continuous drawing messages for which the delay has occur;

obtaining an association relationship between preset total message number of messages and preset delay number threshold;

obtaining a delay number threshold corresponding to the plurality of consecutive drawing messages based on the total message number and the association relationship; and obtaining a delay detection result of the plurality of continuous drawing messages based on the total message number and the delay number threshold.

14. The electronic device of claim 8, further comprising:

after performing delay detection on the message based on the processing time period and the message delay threshold to obtain a delay detection result of the message, in response that the delay detection result of the message is that the message is delayed, obtaining device information of a device running the application program and delay information of the message which is delayed; and outputting the device information and the delay information.

15. A non-transitory computer-readable storage medium having stored thereon a computer program which, when executed by a processor, implements operations of a method of detecting message delay comprising:

obtaining a processing time period corresponding to a message in a target thread, when the target thread of an application program is executed in a terminal system;

performing type recognition on the message in the target thread to obtain a message type of the message;

determining a message delay threshold interval corresponding to the message type, wherein the message delay threshold interval is a predetermined time period corresponding to the message type;

selecting an initial message delay threshold from the message delay threshold interval;

recording a delay frequency at which a delay occurs for the message type;

adjusting the initial message delay threshold within the message delay threshold interval based on the delay frequency to obtain a message delay threshold corresponding to the message; and performing delay detection on the message based on the processing time period and the message delay threshold to obtain a delay detection result of the message.

* * * * *